(12) United States Patent
Dubrovsky

(10) Patent No.: US 8,575,862 B2
(45) Date of Patent: Nov. 5, 2013

(54) POWER SUPPLY FOR AIRFIELD LIGHTING

(75) Inventor: Leo Dubrovsky, Columbus, OH (US)

(73) Assignee: ADB Airfield Solutions, Columbus, OH (US)

( * ) Notice: Subject to any disclaimer, the term of this patent is extended or adjusted under 35 U.S.C. 154(b) by 261 days.

(21) Appl. No.: 13/092,558

(22) Filed: Apr. 22, 2011

(65) Prior Publication Data

US 2012/0268036 A1  Oct. 25, 2012

(51) Int. Cl.
*G05F 1/00* (2006.01)
*H05B 37/02* (2006.01)
*H05B 39/04* (2006.01)
*H05B 41/00* (2006.01)

(52) U.S. Cl.
USPC ........... 315/307; 315/272; 315/206; 315/291; 315/308

(58) Field of Classification Search
None
See application file for complete search history.

(56) References Cited

U.S. PATENT DOCUMENTS

| | | | |
|---|---|---|---|
| 2008/0231211 A1* | 9/2008 | Baarman et al. | 315/294 |
| 2010/0176737 A1* | 7/2010 | Nakada et al. | 315/219 |
| 2012/0056560 A1* | 3/2012 | Iwai et al. | 315/297 |

* cited by examiner

*Primary Examiner* — Anh Tran
(74) *Attorney, Agent, or Firm* — Larry B. Donovan

(57) ABSTRACT

Disclosed herein is a power supply suitable for use with an airfield lighting device. In accordance with an example embodiment, there is disclosed herein, a rectifier that converts a signal from an alternating current (AC) current source to a direct current (DC) voltage. The circuit comprises a current sensor, a controller, and a half active bridge rectifier. The controller receives a signal from the current sensor and controls the operation of the half active bridge rectifier to produce a light emitting diode (LED) current based on the current sensed by the current sensor.

15 Claims, 4 Drawing Sheets

POWER SUPPLY FOR AIRFIELD LIGHTING

CROSS-REFERENCE TO RELATED APPLICATIONS

This application claims the benefit of U.S. Provisional Application No. 61/327,990 filed Apr. 26, 2010, the entire contents of which are incorporated by reference herein.

TECHNICAL FIELD

The present disclosure relates generally to power supplies.

BACKGROUND

Controlled rectifiers are used in lighting equipment to convert a field circuit single phase constant alternating current (AC) current source to a direct current (DC) voltage which is used to power a load. The simplest implementation employs a bidirectional triac that is followed by a diode bridge. This implementation has a poor power factor that can overload the field circuit AC current regulator. Another implementation employs a diode bridge followed by a traditional boost converter topology circuit comprising an inductor, an active switch and a diode.

BRIEF DESCRIPTION OF THE DRAWINGS

The accompanying drawings incorporated herein and forming a part of the specification illustrate the example embodiments.

OVERVIEW OF EXAMPLE EMBODIMENTS

Figure 1:
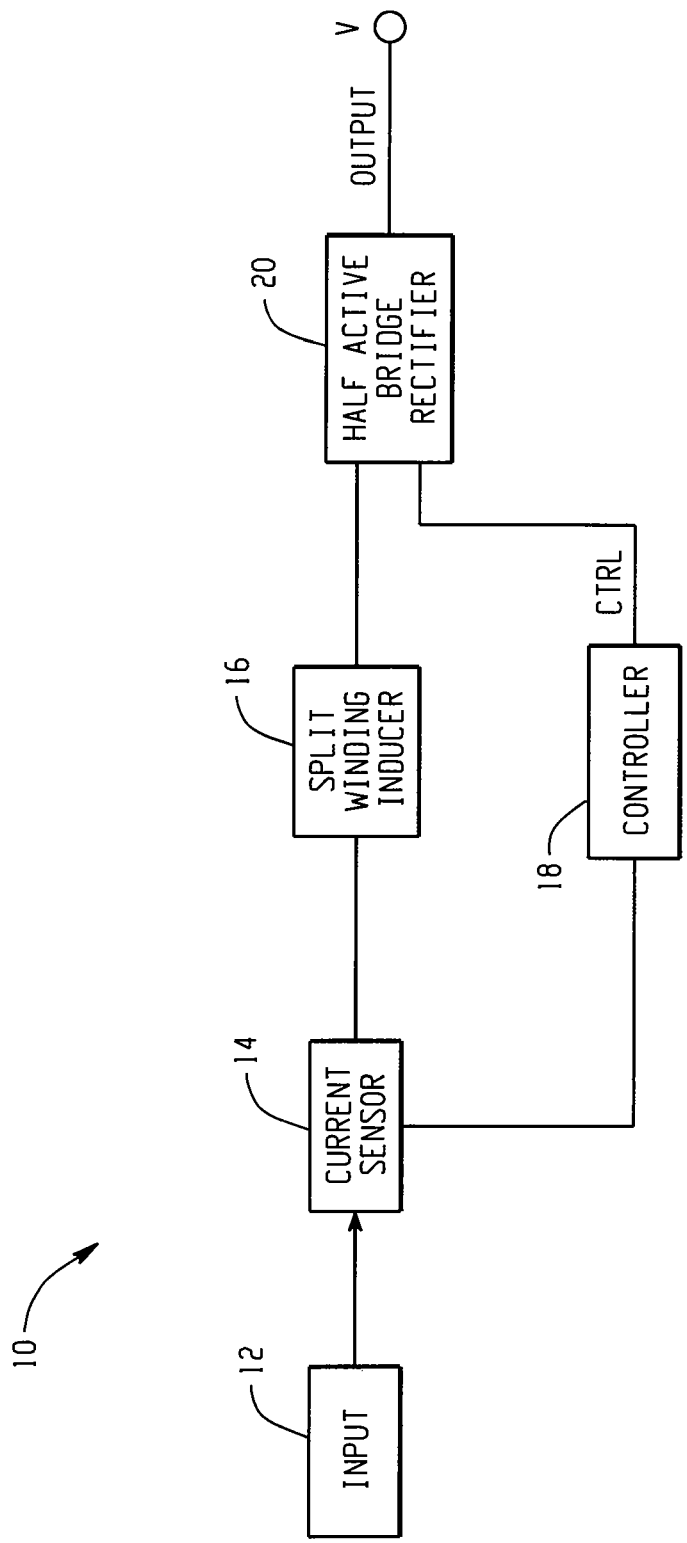
FIG. 1 is a block diagram of a power supply circuit that receives an input current and provides an output voltage to power a light emitting diode.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, a rectifier that converts a signal from an alternating current (AC) current source to a direct current (DC) voltage. The circuit comprises a current sensor, a controller, and a half active bridge rectifier. The controller receives a signal from the current sensor and controls the operation of the half active bridge rectifier to produce an output voltage to power at least one light emitting diode.

In accordance with an example embodiment, there is described herein a circuit that derives clock signal from an external source such as a power source. The external source is used to synchronize the timing of turning lights (such as LEDs) on and off.

In accordance with an example embodiment, there is disclosed herein a lighting fixture that employs an infra red detector to enable a microprocessor in the fixture to be programmed via a remote infra red device.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Referring to FIG. 1, there illustrated a block diagram of an example power supply 10 in accordance with an example embodiment. Power supply 10 receives input power at input 12. In an example embodiment, the input is from an alternating current (AC) source such as an AC current. The current at input 12 is measured by current sensor 14 and is provided to split winding inductor 16. In an example embodiment, current sensor 14 is a current transformer. In another example embodiment, current transformer 14 is a Hall-effect current sensor. Current sensor 14 provides data representative of a magnitude of the input current to controller 18. The current from split winding inductor 16 is provided to half active bridge rectifier 20. Controller 18 suitably comprises logic for performing various functions, including but not limited to the functionality described herein. "Logic," as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In an example embodiment, the controller 18 provides a control signal (CTRL) to control the duty cycle of half active bridge rectifier 20 to achieve an output voltage to provide power to at least one light emitting diode (LED). In particular embodiments, controller 18 receives feedback (OUTPUT) from the half active bridge rectifier 20.

Figure 2:
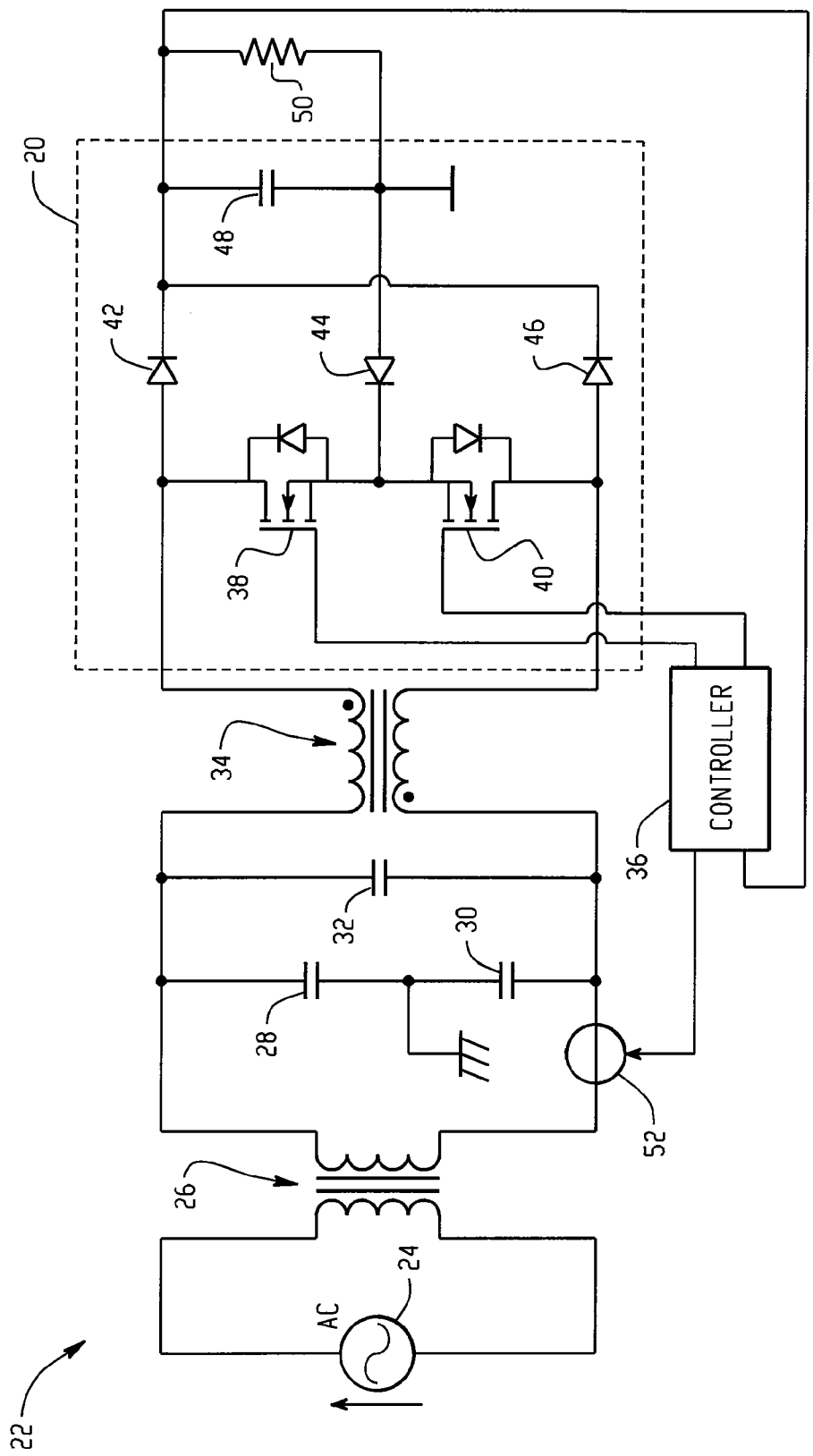
FIG. 2 is a schematic diagram illustrating an example of a power supply with half controlled bridge boost rectifier circuit.

Referring to FIG. 2, there is illustrated a schematic diagram of a Power Supply 22 with a Half Controlled Bridge Boost Rectifier 20 suitable for a Constant Current Series Lightning Application in accordance with an example embodiment. This circuit is suitable converting an input current to an output voltage. The circuit comprises an AC constant current source 24, isolation transformer 26, current sensor 52 (e.g., a current transformer or Hall-effect current sensor), filter capacitors 28, 30, 32, a split winding inductor 34, a controller 36 comprising logic, two controllable switching devices 38, 40 (which in the illustrated example are Metal-Oxide Semiconductor Field-Effect Transistors "MOSFETs"), diodes 42, 44, 46, and output capacitor 48. In the illustrated example, the load is represented by resistor 50.

In operation, an AC current is received from an AC source 24 and passes through isolation transformer 26. Current sensor 52 provides controller 36 with a measurement of the input current signal. Controller 36 sends a pulse width modulated signal (PWM_LED) to set the brightness of LED's coupled to the power supply. Controller 36 opens and closes MOSFETs 38, 40 to control the voltage across capacitor 48 and load 50. When MOSFETS 38, 40 are open, capacitor 48 charges. When MOSFETs 38, 40 are conducting, no current is provided to capacitor 48 and thus capacitor 48 discharges. Split winding inductor 34 provide high voltage (boost conversion) when MOSFETs 38, 40 open and charges when the MOSFETs 38, 40 close. Capacitors 28, 30, 32 and split winding inductor 34 prevent high frequency and Electromagnetic Interference (EMI) harmonic conversion signals from going back into the AC source 24.

Figure 3:
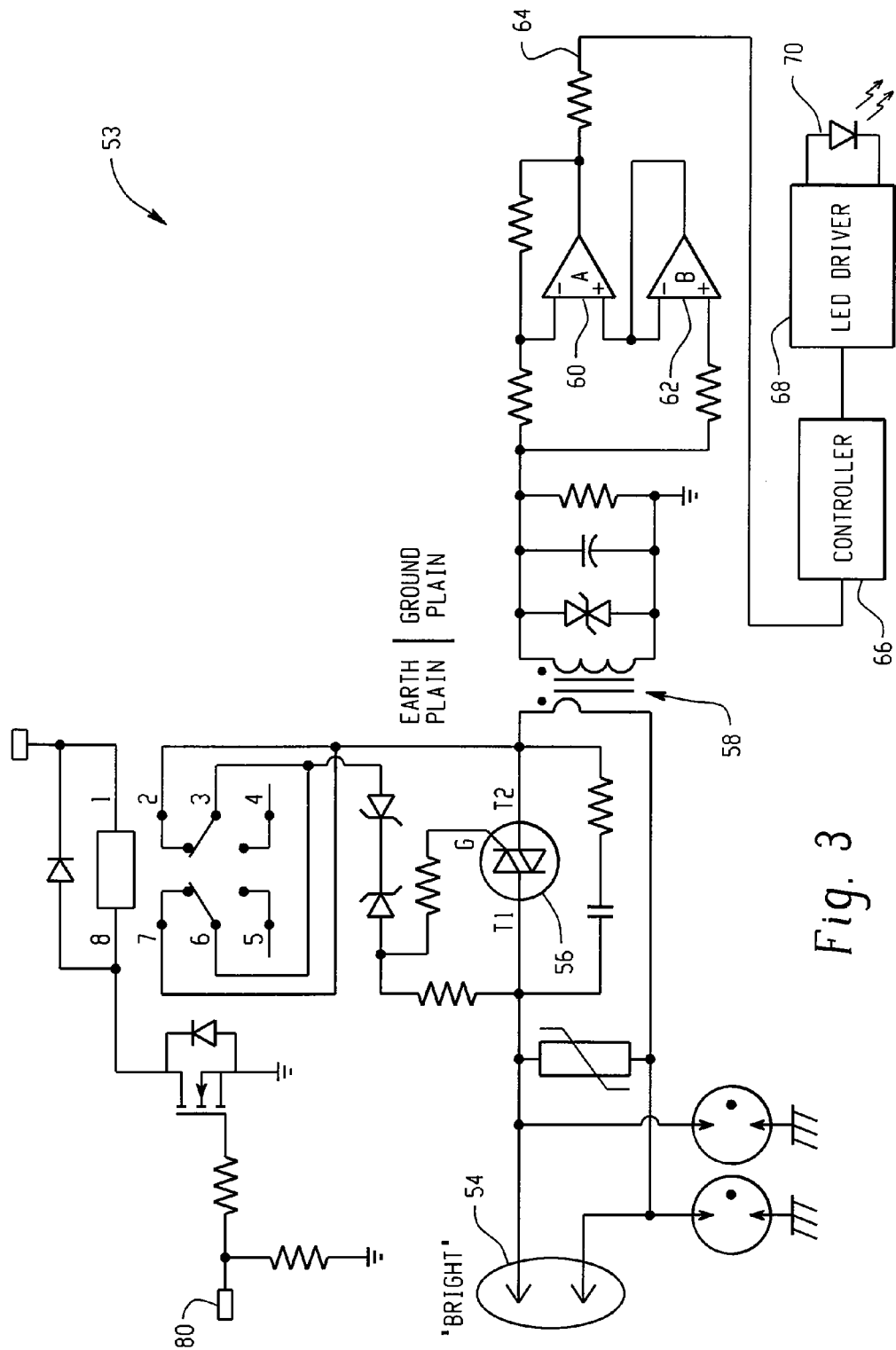
FIG. 3 is a schematic diagram of a circuit configured to receive a brightness signal for an incandescent bulb.

FIG. 3 illustrates an example of a circuit 53 configured to be connected to an external device via input/output 54. For example, input/output may receive a signal/power ("BRITE") intended for an incandescent bulb from an external device. This circuit 53 can enable a LED to be used in a fixture configured for an incandescent bulb.

Triac 56 provides a phantom load to the external device coupled to input/output 54 making it appear to any external devices coupled with input/output 54 that an incandescent bulb is attached and working. The signal received on input/output 54 is converted to a current signal by transformer 58. The output of transformer 58 is provided to a signal conditioning circuit (rectifier) comprising operational amplifiers 60, 62, where amplifier 60 amplifies the positive side of an AC signal and amplifier 62 amplifies the negative part of the AC signal. The output of the circuit is provided to a controller 66. Controller 66 suitably comprises logic for providing the functionality described herein. In an example embodiment, the controller 66 provides a signal to the LED driver circuit 68 to switch LED 70 on and off.

In particular embodiments, the signal conditioned output of the transformer 58 is employed to synchronize flashing of the LED 70 with external lights. Signals indicating when the external lights are flashing may be received from the external lights via the input/output 54.

In particular embodiments, the circuit 53 further comprises a "FAIL" input 80. The fail input 80 can be used to mimic a failed incandescent bulb if the controller 66 determines that LED 70 is not operating. For example, when the controller 66 asserts FAIL, triac 56 may open. This can allow external devices to determine whether the LED 70 is not working.

Figure 4:
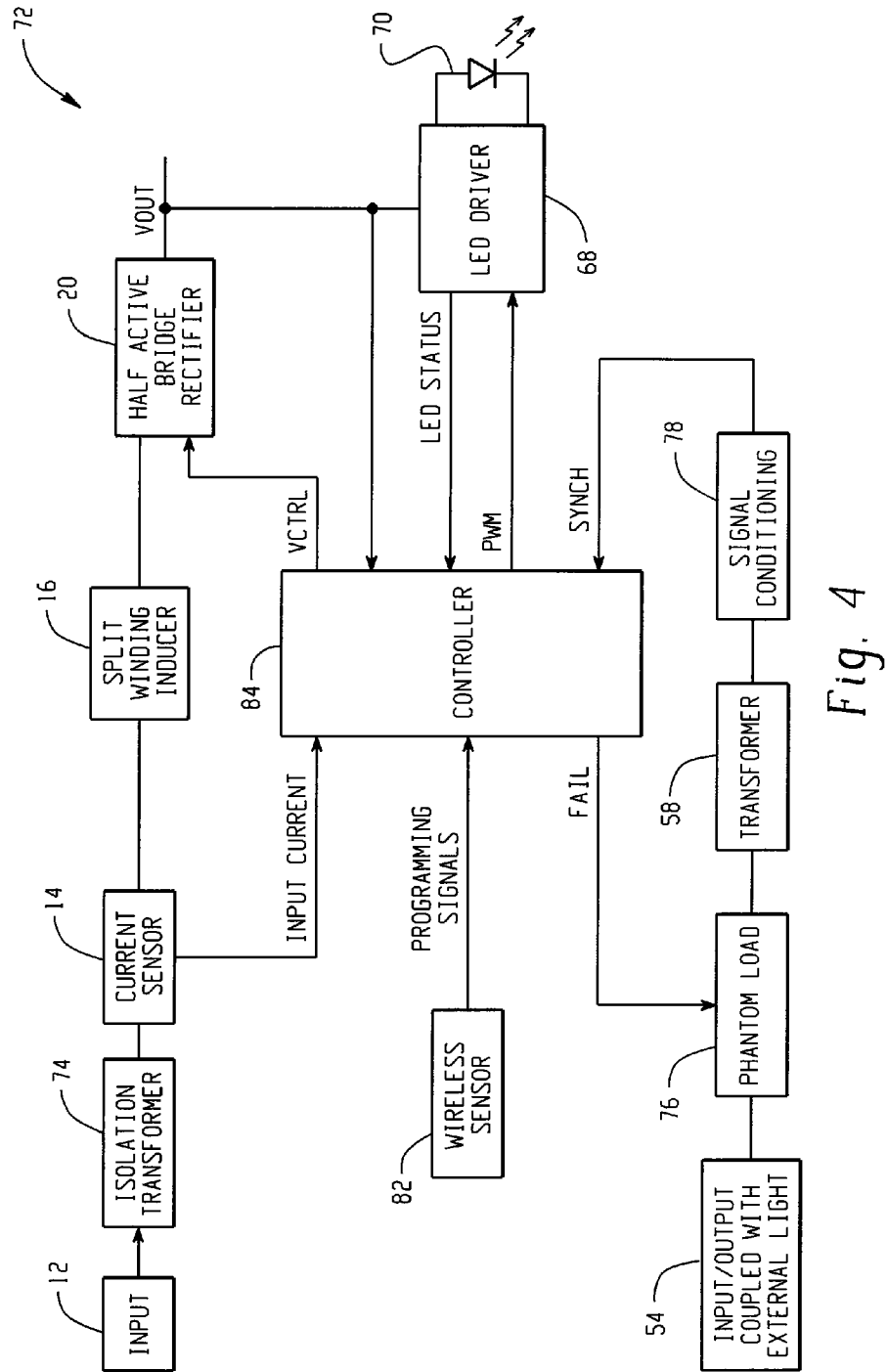
FIG. 4 illustrates an example of an airfield lighting device.

FIG. 4 illustrates an example of an airfield lighting device 72. The airfield lighting device comprises a power supply that receives input power at input 12. In an example embodiment, the input is from an alternating current (AC) source such as an AC current. An isolation transformer 74 receives the current from the input 12. The current from input 12, after passing through isolation transformer 74, is measured by current sensor 14 and is provided to split winding inductor 16. In an example embodiment, current sensor 14 is a current transformer. In another example embodiment, current transformer 14 is a Hall-effect current sensor. Current sensor 14 provides data representative of the input current to controller 84. The current from split winding inductor 16 is provided to half active bridge rectifier 20. Controller 84 comprises logic that provides a control signal (VCTRL) to half active bridge rectifier 20 to achieve an output voltage that is based on the data representative of the input current. In particular embodiments, the controller 84 receives feedback (VOUT)) from the output of the half active bridge rectifier.

The output (VOUT) of the half active bridge rectifier 20 is provided to light emitting diode (LED) driver circuit 68. The LED driver circuit 68 suitably comprises electronics for providing the appropriate voltage and/or current to LED 70. In the illustrated example, the controller 84 provides a control signal, which may be a pulse width modulated (PWM) signal to LED driver circuit 68 to control the intensity of LED 70 and/or flashes of LED 70.

The airfield lighting device 72 further comprises a circuit that can be connected to an external device via input/output 54. In an example embodiment, the input/output 54 may be coupled to an external device that is operable to provide power to an incandescent bulb. Phantom load 76 is coupled with input/output 54. In an example embodiment, phantom load 76 mimics the load of an incandescent bulb so that any external devices coupled to input/output 54 can determine that the LED 70 of the airfield lighting device 72 is operating. In an example embodiment, a triac (see e.g., triac 56 in FIG. 3) can be employed for implementing the phantom load 76. The signal received on input/output 54 is converted to a current signal by transformer 58. The output of transformer 58 is provided to a signal conditioning circuit (rectifier) 78 (see FIG. 3 for an example of a signal condition circuit suitable for implementing signal conditioning circuit 78). The output of the signal conditioning circuit 78 is provided to a controller 84. The controller 84 provides a signal to the LED driver circuit 68 which provides the appropriate current and/or voltage to the LED 70 based on the signal received from the controller 84.

In particular embodiments, the output of transformer 58 (SYNCH) is employed to synchronize flashing of LED 70 with external lights. Signals indicating when the external lights are flashing may be received from the external lights via input/output 54.

In an example embodiment, circuit 53 further comprises a "FAIL" input 80. The fail input can be used if the controller 84 determines that the LED 70 is not operating. For example, LED driver 68 may provide a signal (LED STATUS) to controller 84 that allows the controller to determine whether LED 70 is operating. For example, LED STATUS may indicate the voltage across LED 70 or the current passing through LED 70. When controller 84 asserts FAIL to the phantom load 76, the phantom load 76 can change characteristics to mimic a failed incandescent bulb. For example, the phantom load 76 may open. This can allow external devices to determine whether LED 70 (airfield lighting device 72) is working.

In an example embodiment, a wireless (e.g., infra red) sensor 82 may be coupled to controller 84. This can allow a user with a wireless remote control device, such as an infra red remote control device, to program controller 27.

Although the example illustrated in FIG. 4 illustrates a single controller for performing the functionality described herein, those skilled in the art should readily appreciate that the example embodiments described herein should not be construed as so limited. Those skilled in the art should readily appreciate that any physically realizable number of controllers may be employed to provide the functionality of the example embodiments described herein.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a current sensor for measuring an input current;
a split winding inductor having an input coupled with the current sensor, and an output;
a half active bridge rectifier having a first input coupled with the output of the split winding inductor, a second input, and an output; and
a controller having a first input coupled with the current sensor, a second input coupled with the output of the half active bridge rectifier, and an output coupled with the second input of the half active bridge rectifier;
wherein the controller provides a control signal to the half active bridge rectifier to produce a voltage at the output of the half active bridge rectifier to provide power to at least one light emitting diode.

2. The apparatus of claim 1, wherein the current sensor is a current transformer.

3. The apparatus of claim 1, wherein the current sensor is a Hall-effect current sensor.

4. The apparatus of claim 1, further comprising an isolation transformer for receiving the input current, the isolation transformer providing a current to the current sensor.

5. The apparatus of claim 4, further comprising at least one capacitor coupled interstitial to the isolation transformer and split winding inductor for isolating high frequency and electro-magnetic interference harmonic conversion signals.

6. The apparatus of claim 1, wherein the half active bridge rectifier comprises:
two controllable switching devices coupled in a cascade configuration;
a capacitor coupled across one of the controllable switching devices;
wherein the controller switches the controllable switching devices in order to control a voltage across the capacitor.

7. The apparatus set forth in claim 1, further comprising:
a light source coupled with the controller;
a second input for receiving a signal from an external lighting device;
a phantom load coupled across the second input; and
a signal conditioning circuit coupling the second input to the controller;
wherein the controller synchronizes flashing the light source with the signal received from the second input.

8. The apparatus set forth in claim 7, wherein the phantom load comprises a triac.

9. The apparatus set forth in claim 7, wherein the controller is coupled with the phantom load and operable to control the phantom load; and
wherein the controller changes the phantom load in response to detecting the light source is inoperable.

10. The apparatus set forth in claim 7, wherein the light source is a light emitting diode.

11. The apparatus set forth in claim 7, further comprising a wireless sensor coupled with the controller;
wherein the controller receives programming instructions for controlling the operation of the light source via the wireless sensor.

12. The apparatus set forth in claim 11, wherein the wireless sensor is an infra red sensor.

13. An apparatus, comprising:
a current sensor for measuring an input current;
a split winding inductor having an input coupled with the current sensor, and an output;
means for producing a voltage from a current received from the split winding inductor; and
control means for controlling the means for producing a voltage, the control means receives a measurement of the input current from the sensor and provides a control signal to the means for producing a voltage to achieve an output voltage based on the measurement of the input current.

14. The apparatus set forth in claim 13, further comprising:
a light source coupled with the control means;
a second input for receiving a signal from an external lighting device; and
means for providing a phantom load coupled across the second input; and
wherein the controller means flashes the light source in synchronization with the signal received from the second input.

15. The apparatus set forth in claim 13, further comprising a means for sensing a wireless signal coupled with the control means;
wherein the control means receives programming instructions for controlling the operation of the light source via the means for sensing a wireless signal.

* * * * *